(12) United States Patent
Yoshida

(10) Patent No.: US 7,365,447 B2
(45) Date of Patent: Apr. 29, 2008

(54) HORIZONTAL AXIS WIND TURBINE

(75) Inventor: Shigeo Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 114 days.

(21) Appl. No.: 11/472,466

(22) Filed: Jun. 22, 2006

(65) Prior Publication Data

US 2006/0290140 A1 Dec. 28, 2006

(30) Foreign Application Priority Data

Jun. 24, 2005 (JP) ............................. 2005-184507

(51) Int. Cl.
*F03D 11/04* (2006.01)
(52) U.S. Cl. ........................................ 290/55; 290/44
(58) Field of Classification Search ................ 290/43, 290/44, 54, 55; 415/4.2, 4.3; 416/156, 244 R
See application file for complete search history.

(56) References Cited

U.S. PATENT DOCUMENTS 6,320,273 B1 * 11/2001 Nemec ........................ 290/55
6,676,122 B1 * 1/2004 Wobben ....................... 290/55
6,902,370 B2 * 6/2005 Dawson et al. .............. 415/4.1
7,161,260 B2 * 1/2007 Kruger-Gotzmann et al. 290/55
7,244,102 B2 * 7/2007 Delucis ....................... 416/156
7,276,808 B2 * 10/2007 Weitkamp et al. ............ 290/55

FOREIGN PATENT DOCUMENTS

JP 59-147879 A 8/1984

* cited by examiner

*Primary Examiner*—Nicholas Ponomarenko
(74) *Attorney, Agent, or Firm*—Birch, Stewart, Kolasch & Birch, LLP

(57) ABSTRACT

Disclosed is a horizontal axis wind turbine of an downwind type having a rotor disposed downwind of a tower, comprising: a rotor having a hub and a blade; a nacelle to support the rotor rotatably through a main shaft connected to the hub; a cylindrical tower supporting to enable free yaw rotation of the nacelle; and an exhaust fan disposed on the nacelle, to exhaust an air inside the nacelle, wherein the cylindrical tower has a plurality of through-holes which are formed in a wall of the tower and scattered over an area of the wall along a circumferential direction thereof, to pass wind entering the rotor through the through-holes, and the exhaust fan is communicated with the through-holes through inner spaces of the tower and the nacelle, to generate aspiration force through the through-holes.

4 Claims, 2 Drawing Sheets

ROTOR FACE

ROTOR FACE

HORIZONTAL AXIS WIND TURBINE

BACKGROUND OF THE INVENTION

1. Field of the Invention

The present invention relates to reduction of tower shadow effect of a downwind horizontal axis wind turbine.

2. Description of Related Art

Generally, for a downwind horizontal axis wind turbine disposing a rotor downwind to the tower, variable load and ultra-low frequency noise caused by aerodynamic interaction of tower wake and blades have been a technical problem, and are known as the tower shadow effect.

In the past, as a method to suppress this tower shadow effect, a clearance between the rotor and the tower has been secured. This method includes relatively enlarging clearance by making the tower diameter small.

Japanese patent publication JP-Sho-59-147879A (See lower right-hand corner, Page 2) mentions a downwind horizontal axis wind turbine, wherein a airfoil is attached to the tower, structured so as to support the upper and lower parts of the airfoil which is rotatable freely with bearings. In the document, it is disclosed that the tip of the airfoil, which is attached to the tower, always faces downwind, and that the wind against the tower flows smoothly along the airfoil, causing no vortex and little decrease in flow speed behind the tower. Furthermore, therefore, it is disclosed that it prevents excessive bending force on the blades, substantially improves durability, and substantially reduces noise caused by vibration in twisting direction.

However, the method ensuring a clearance between the rotor and the tower is impractical in view of retention of strength and stiffness of tower.

The technique cited in JP-Sho-59-147879A would involve a large-scale apparatus resulting in cost increase. Depending on wind speed, a resonance of the self-excited vibration of such an apparatus and the natural vibration of the tower may occur. In the case of sticking, a considerable load is generated around the maximum lifting capacity and the maximum drag. Difficulty in apparatus maintenance is another problem.

SUMMARY OF THE INVENTION

The present invention is developed in view of the above problems regarding the prior art. An object of the invention is to present a downwind horizontal axis wind turbine which effectively enables reduction of tower shadow effect with simple configuration.

In order to solve the above-described problems, in accordance with a first aspect of the present invention, the horizontal axis wind turbine of an downwind type having a rotor disposed downwind of a tower, comprises:

a rotor having a hub and a blade;

a nacelle to support the rotor rotatably through a main shaft connected to the hub;

a cylindrical tower supporting the nacelle to enable free yaw rotation thereof; and an exhaust fan disposed on the nacelle, to exhaust an air inside the nacelle, wherein the cylindrical tower has a plurality of through-holes which are formed in a wall of the tower and scattered over an area of the wall along a circumferential direction thereof, to pass wind entering the rotor through the through-holes, and the exhaust fan is communicated with the through-holes through inner spaces of the tower and the nacelle, to generate aspiration force through the through-holes.

According to the present invention, by the operation of the exhaust fan, the air surrounding the tower is taken in through the through-holes formed in a wall of the tower. Thus it is possible to reduce deviation of airflow around the tower away from the tower surface, to let the air run smoothly round to behind the tower, to subdue decrease in airflow speed and pressure behind the tower. As a result, it is possible to reduce tower shadow effect such as variable load and ultra-low frequency noise, caused by aerodynamic interaction of the tower wake and the blades.

Because the through-holes are formed in a wall of the tower and scattered over an area of the wall along a circumferential direction thereof, without employing a complicated mechanical configuration, even in the event of change in the rotor direction, it is similarly possible to subdue decrease in airflow speed and pressure behind the tower, and to reduce tower shadow effect.

Preferably, the through-holes are disposed in an area corresponding to that between the lowest point on an edge of a rotation radius of the rotor and the lowest point of a portion by 50 percent of the rotation radius.

Further, as for the height of the area in which the through-holes are scattered, it is desirable to dispose it between the lowest point on an edge of a rotation radius of the rotor and the lowest point of a portion by 50 percent of the rotation radius. According to such a configuration, it is possible to subdue decrease in airflow speed and pressure against the tip area of the blades where there is high degree of influence from the tower shadow effect, as well as to reduce workload involved in production of the tower.

Preferably, the exhaust fan cools down a heat source in the nacelle.

For a wind turbine having an exhaust fan to cool down heat sources such as an electrical generator and a speed-up gear equipped in a nacelle, it is possible to realize the present invention by applying simple structural changes to move its through-holes to the tower surface and scatter them in the circumferential direction.

DETAILED DESCRIPTION OF THE PREFERRED EMBODIMENTS

An embodiment of the invention will be described in detail with reference to accompanying drawings which are given by way of illustration only, and thus are not intended as a definition of the limits of the scope of the invention.

Figure 1:
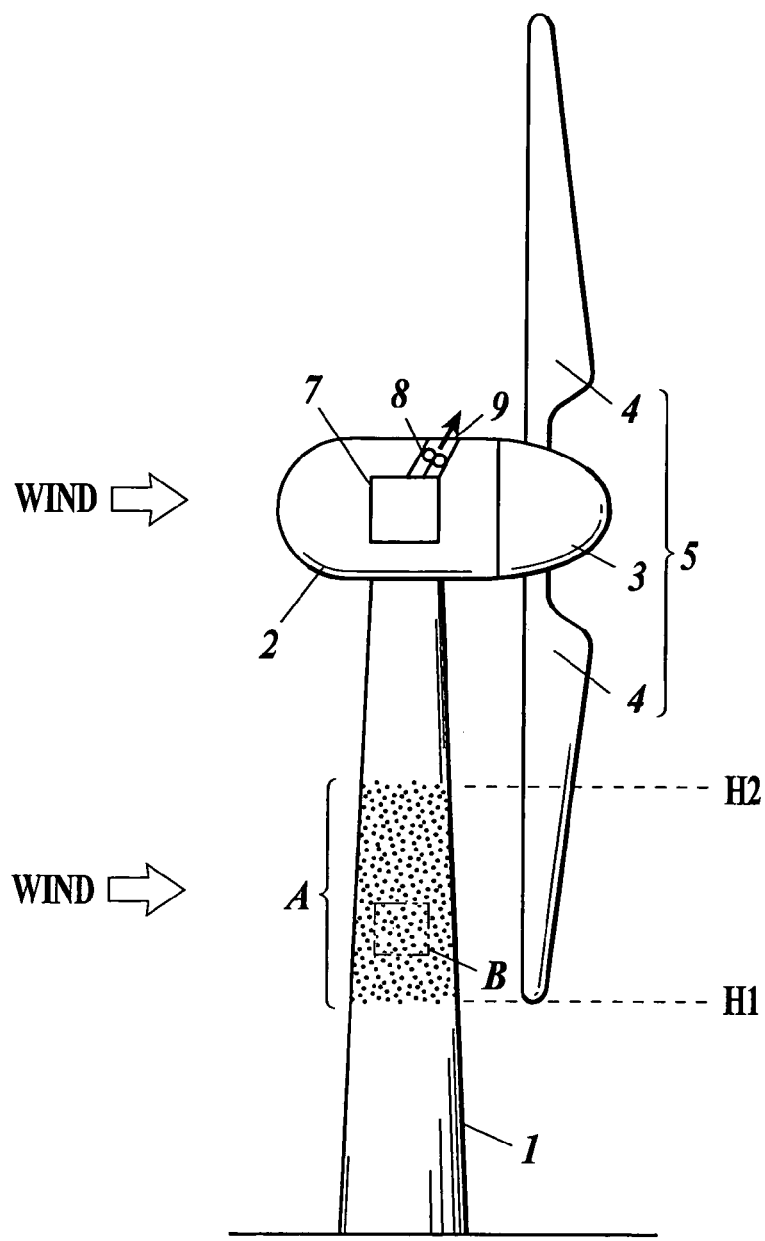
FIG. 1 is a schematic view showing a whole construction of a horizontal axis wind turbine according to an embodiment of the invention.

As shown in FIG. 1, the horizontal axis wind turbine according to the present embodiment has a tower 1, a nacelle 2, and a rotor 5. The rotor 5 has a hub 3 and blades 4.

The tower 1 is cylindrical, that is, has an inner void space and a cylindrical wall surrounding the space, but has not a latticed frame shape. The tower 1 supports the nacelle 2 to enable free yaw rotation of the nacelle. The nacelle 2 supports the rotor 5 rotatably through a main shaft (not shown) connected to the hub 3. A tip of the main shaft projects outward from the nacelle 2, and the rotor 5 is attached to the tip of the main shaft to rotate with the main shaft. Inside the nacelle 2, a speed-up gear, an electrical generator and the main shaft, which are not shown, are contained, and the rotor is linked to the main shaft.

The horizontal axis wind turbine according to the embodiment is a downwind type. When receives quartering wind or crosswind to the rotor 5, the nacelle 2 rotates around the yaw axis to place the rotor 5 downwind to the tower 1. The rotation of the rotor is transmitted to the electrical generator through the main shaft, to generate electricity.

Inside the nacelle 2, an exhaust fan 8 which cools down a heat source 7 is disposed. The heat source 7 includes the above-described electrical generator and the speed-up gear. The exhaust fan 8 is a blower fan or the like, provided so as to discharge air inside the nacelle 2 through the exhaust opening 9 formed in the outer surface of the nacelle.

Figure 2A:
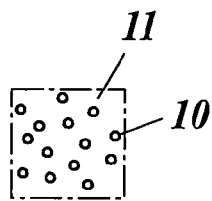
FIG. 2A is an enlarged view of the portion B in FIG. 1.
Figure 2B:
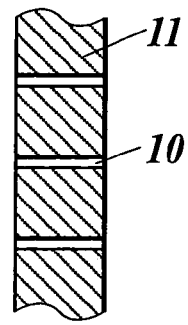
FIG. 2B is an enlarged sectional view of the portion B.

FIG. 1 shows the area A of the height H1 to height H2. FIG. 2A is an enlarged view of the portion B in the area A, and FIG. 2B is a sectional view thereof.

The height H1 is at the same level as the lowest point that the tips of blades 4 pass through, and is configured to correspond to the lowest point of the area that the wind flowing into the rotor 5 passes through. The predetermined height H2 is higher than the height H1. The predetermined height H2 is allocated within the area from the height H1 to the upper end of the tower 1, at an appropriate level taking into consideration the reduction of tower shadow effect and other structural requirement. Although the predetermined height H2 could be determined at the lower end of the nacelle 2, it is allocated below the level of the lower end of the nacelle 2, as the influence of tower shadow effect is small around the center of the rotor 5. For example, as shown in FIG. 1, it is appropriate to determine the predetermined height H2 at the lowest level corresponding to the point about 50 percent of the diameter of the rotor 5 away from its rotation center.

In the area A which is from the height H1 to the height H2, the through-holes 10 are formed in the wall of the tower. The through-holes 10 are holes that scatter along in the circumferential direction. It is desirable to disperse the through-holes 10 approximately evenly in the circumferential direction. This is to obtain equal reduction of the tower shadow effect whichever direction the rotor 5 faces. To this end, microscopic unevenness is acceptable. The through-holes 10 need not be dispersed evenly in the vertical direction. Further, the through-holes 10 in the circumferential direction may vary in disposition and number according to the height.

In all cases, the through-holes 10 are to be dispersed to avoid extreme maldistribution. However, this is not to impede efforts to reduce the tower shadow effect by such means as to increase the density of the through-holes 10 in the lower positions because within the area from height H1 to the upper end of the tower 1, the lower the position the more prominently the tower shadow effect occurs.

Additionally, in the area A which is from the height H1 to height H2, the through-holes 10 on the tower surface may be disposed below the height H1.

The through-holes 10 may be in any shape. They may be circles or slits, but it is not limited to these shapes.

As shown in FIG. 2B, the through-holes 10 penetrate a member 11 through both of its surfaces. Although the direction and pathway of this penetration of the through-holes are not limited to perpendicular or shortest paths, normally, paths that are perpendicular to the member 11 are adequate. The member 11 may be the wall of the tower 1. In such a case, the air outside the tower 1 enters inside the tower 1, as the air outside the member 11 enters inside the member 11 through the through-holes 10.

The member 11 may be a cylindrical member covering the tower 1. In such a case, one or a plurality of through-holes are allocated on the wall of the tower 1, the above-described cylindrical member is attached to the tower 1 to cover the one or a plurality of through-holes. The upper and lower ends of the above-described cylindrical member are attached airproof (besides the through-holes 10) to the wall surface of the tower 1. The tower 1 and the member 11 are structured so that the air outside the member 11 enters inside the member 11 through the through-holes 10, and enter the tower 1 through the through-holes. The air path from inside of the member 11 to the through-holes disposed on the wall of the tower 1 can be formed simply by providing a space between the member 11 and the wall of the tower 1.

In the latter case, wherein the member is a cylindrical member covering the tower 1, it is easy to process the tower 1, and it is possible to unitize, install and replace the member having the through-holes 10. Therefore, by replacing, adding and partially removing the unit having the through-holes 10 without applying changes to the tower 1, it is possible to change the shape, the distribution density and the height of distribution range of the through-holes 10. Moreover, it is possible to maintain the strength of the tower 1, regardless of the total area of the through-holes 10.

The through-holes 10 are in communication with the exhaust fan 8 through the inner space of the tower 1 and the nacelle 2. By operating the exhaust fan 8, the air outside the tower 1 (especially the air in the range A) is sucked from the through-holes 10 into the tower 1, raised into the nacelle 2, and exhausted outside the nacelle 2 from the exhaust outlet 9 by the exhaust fan 8.

Thus, by the above-described configuration, the so-called tower shadow effect is reduced. This is explained with reference to FIG. 3 and FIG. 4.

Figure 3:
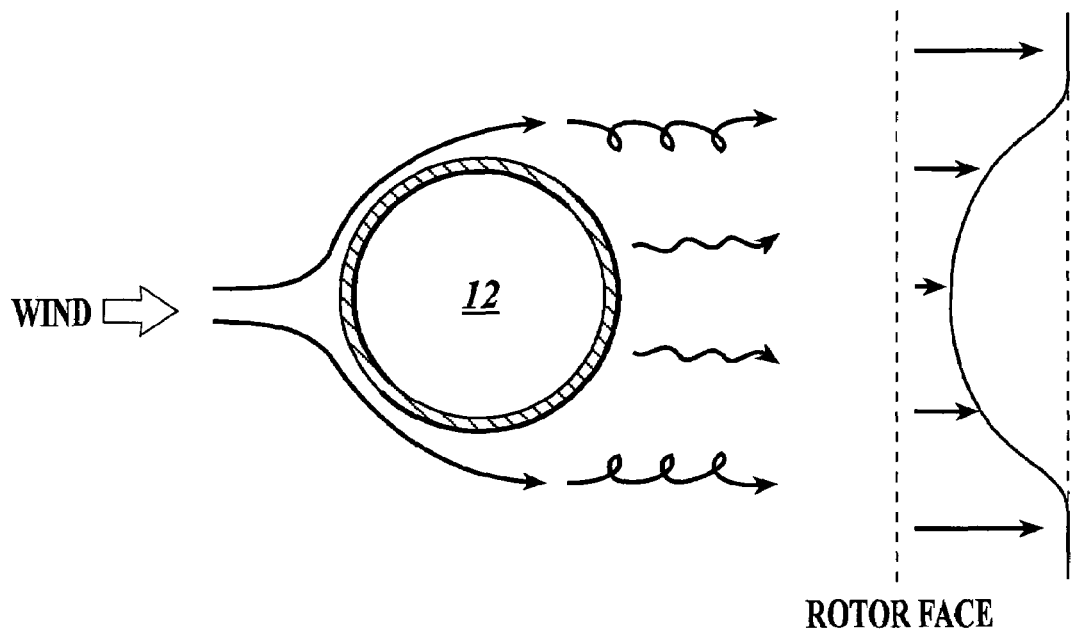
FIG. 3 is a schematic view showing a horizontal section of a tower of the horizontal axis wind turbine and showing the surrounding airflow, according to a conventional technique.
Figure 4:
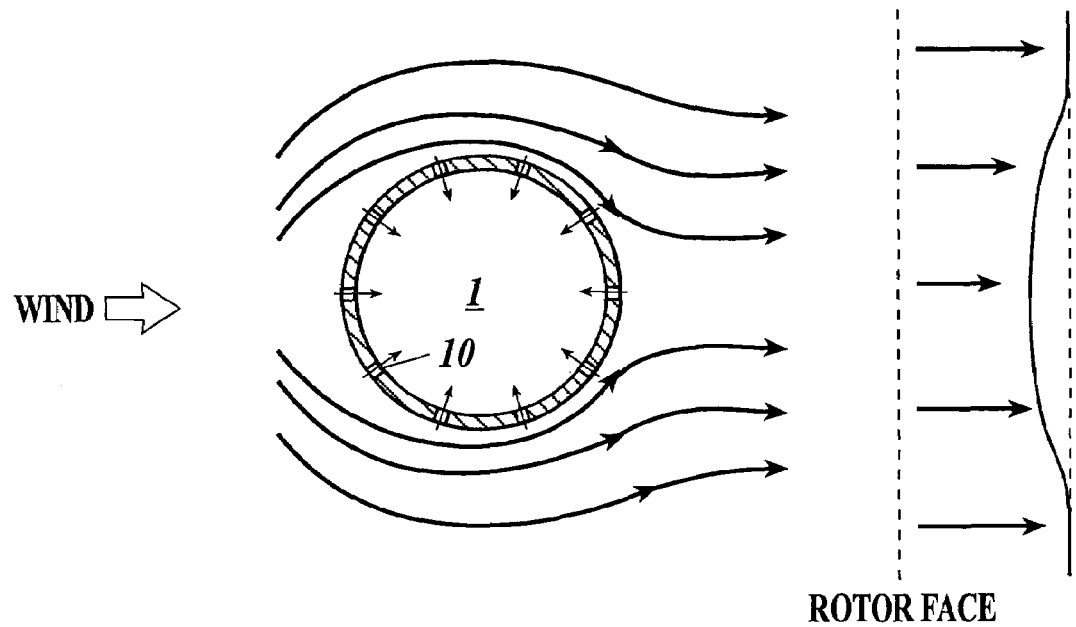
FIG. 4 is a schematic view showing a horizontal section of a tower of the horizontal axis wind turbine and showing the surrounding airflow, according to an embodiment of the invention.

FIG. 3 and FIG. 4 are schematic views showing horizontal sections of towers of the horizontal axis wind turbines and showing the surrounding airflows. Each view shows a typical profile of wind speed distribution or wind pressure distribution against the rotor of the tower wake. FIG. 3 shows the tower 12 without through-holes. FIG. 4 shows the tower 1 according to the embodiment of the invention. Each of the figures shows a state when a wind blows at the same speed respectively against each of the tower 12 and the tower 1.

As shown in FIG. 3, the wind passing by the tower 12 without through-holes causes a vortex flow in the wake of the tower 12, and the wake flow of tower 12 diverges from the tower 12 leaving little airflow running round behind the tower 12. Consequently, the wind speed and pressure against the rotor of the tower wake reduces significantly behind the tower 12. It imposes variable load to the blades passing through behind the tower 12, and causes ultra-low frequency noise by vibration.

On the contrary, as shown in FIG. 4, in the wind passing by the tower 1 according to the embodiment, with through-holes 10, the layer of the wind flowing close to the surface of the tower 1 passes through along the outer rounded shape of the tower 1 smoothly, with a part thereof being sucked into the inside of the tower through the through-holes 10. Relatively large part of the wind flows around to the back of the tower 1. As a result, reduction of the wind speed and pressure against the rotor of the tower wake behind the tower 1 can be suppressed. Thereby, variable load to the blades by the wind passing through behind the tower 12 and ultra-low frequency noise by vibration are also suppressed. That is, it is possible to reduce the tower shadow effect in a downwind horizontal axis wind turbine.

The entire disclosure of Japanese Patent Application No. 2005-184507 filed on Jun. 24, 2005, including specification, claims, drawings and summary are incorporated herein by reference in its entirety.

What is claimed is:

1. A horizontal axis wind turbine of an downwind type having a rotor disposed downwind of a tower, comprising:
    a rotor having a hub and a blade;
    a nacelle to support the rotor rotatably through a main shaft connected to the hub;
    a cylindrical tower supporting to enable free yaw rotation of the nacelle; and
    an exhaust fan disposed on the nacelle, to exhaust an air inside the nacelle,
    wherein the cylindrical tower has a plurality of through-holes which are formed in a wall of the tower and scattered over an area of the wall along a circumferential direction thereof, to pass wind entering the rotor through the through-holes, and the exhaust fan is communicated with the through-holes through inner spaces of the tower and the nacelle, to generate aspiration force through the through-holes.

2. The horizontal axis wind turbine as claimed in claim 1, wherein the through-holes are disposed in the area corresponding to that between the lowest point on an edge of a rotation radius of the rotor and the lowest point of a portion by 50 percent of the rotation radius.

3. The horizontal axis wind turbine as claimed in claim 1, wherein the exhaust fan cools down a heat source in the nacelle.

4. The horizontal axis wind turbine as claimed in claim 2, wherein the exhaust fan cools down a heat source in the nacelle.

* * * * *